(12) United States Patent
Tokuda et al.

(10) Patent No.: US 8,671,765 B2
(45) Date of Patent: Mar. 18, 2014

(54) PRESSURE SENSOR HAVING A DIAPHRAGM

(75) Inventors: Tomohisa Tokuda, Tokyo (JP);
Hirofumi Tojo, Tokyo (JP); Nozomi Kida, Tokyo (JP)

(73) Assignee: Azbil Corporation, Tokyo (JP)

( * ) Notice: Subject to any disclaimer, the term of this patent is extended or adjusted under 35 U.S.C. 154(b) by 274 days.

(21) Appl. No.: 13/085,774

(22) Filed: Apr. 13, 2011

(65) Prior Publication Data

US 2011/0247421 A1    Oct. 13, 2011

(30) Foreign Application Priority Data

Apr. 13, 2010  (JP) .................................. 2010-092268

(51) Int. Cl.
G01L 13/02    (2006.01)
G01L 15/00    (2006.01)

(52) U.S. Cl.
USPC .................................. 73/716; 73/700; 73/715

(58) Field of Classification Search
None
See application file for complete search history.

(56) References Cited

U.S. PATENT DOCUMENTS

| | | | | |
|---|---|---|---|---|
| 4,102,210 A | * | 7/1978 | Couston et al. .................. | 73/727 |
| 4,320,664 A | * | 3/1982 | Rehn et al. ....................... | 73/708 |
| 4,530,244 A | * | 7/1985 | Starr ................................ | 73/727 |
| 5,259,248 A | * | 11/1993 | Ugai et al. ...................... | 73/721 |
| 5,291,788 A | * | 3/1994 | Oohata et al. ................... | 73/727 |
| 5,537,882 A | * | 7/1996 | Ugai et al. ....................... | 73/727 |
| 5,677,493 A | * | 10/1997 | Yamamoto et al. .............. | 73/727 |
| 6,422,088 B1 | * | 7/2002 | Oba et al. ......................... | 73/754 |
| 6,973,836 B2 | * | 12/2005 | Katsumata et al. ............... | 73/754 |
| 7,318,351 B2 | * | 1/2008 | Cobianu et al. .................. | 73/715 |
| 7,509,866 B2 | * | 3/2009 | Krog et al. ....................... | 73/716 |
| 7,694,552 B2 | * | 4/2010 | Khuri-Yakub et al. ....... | 73/64.53 |
| 7,806,001 B1 | * | 10/2010 | Shaw ............................... | 73/715 |
| 7,823,456 B2 | * | 11/2010 | Krog et al. ....................... | 73/716 |
| 7,856,885 B1 | * | 12/2010 | Bhansali et al. ................. | 73/721 |
| 8,042,400 B2 | * | 10/2011 | Yoneda et al. ................... | 73/716 |
| 8,161,820 B2 | * | 4/2012 | Yoneda et al. ................... | 73/721 |
| 2005/0172723 A1 | | 8/2005 | Kato et al. | |
| 2010/0083766 A1 | | 4/2010 | Yoneda et al. | |

FOREIGN PATENT DOCUMENTS

| | | |
|---|---|---|
| CN | 1055060 A | 10/1991 |
| CN | 1052538 C | 5/2000 |
| CN | 1651886 A | 8/2005 |
| JP | 6-213746 A | 8/1994 |
| JP | 8-128911 A | 5/1996 |
| JP | 9-304206 A | 11/1997 |
| JP | 2002-277337 A | 9/2002 |

OTHER PUBLICATIONS

Korean Office Action dated Sep. 14, 2012, which issued during the prosecution of Korean Patent Application No. 10-2011-0032211.

(Continued)

*Primary Examiner* — Lisa Caputo
*Assistant Examiner* — Jermaine Jenkins
(74) *Attorney, Agent, or Firm* — Troutman Sanders LLP

(57) ABSTRACT

A pressure sensor comprising: a sensor chip; a differential pressure diaphragm provided in the center portion of the sensor chip; a differential pressure gauge provided in the differential pressure diaphragm; a static pressure diaphragm provided at the outer peripheral portion of the differential pressure diaphragm; a first static pressure gauge formed at an edge portion of the static pressure diaphragm; and a second static pressure gauge formed at a center portion of the static pressure diaphragm.

5 Claims, 14 Drawing Sheets

(56) References Cited

OTHER PUBLICATIONS

Chinese Office Action, dated Mar. 5, 2013, which issued during the prosecution of Chinese Patent Application No. 201110097578, which corresponds to the present application.

Xiuwen, Z et al., "Development of Polysilicon Pressure Sensor with High Performance" Journal of Transduction Technology, 1993.
Chinese Office Action, dated Aug. 27, 2013, which issued during the prosecution of Chinese Patent Application No. 201110097578.
Japanese Office Action, dated Aug. 22, 2013, which issued during the prosecution of Japanese Patent Application No. 2010-092268.

* cited by examiner

PRESSURE SENSOR HAVING A DIAPHRAGM

CROSS REFERENCE TO RELATED APPLICATIONS

The present application claims priority under 35 U.S.C. §119 to Japanese Patent Application No. 2010-092268, filed Apr. 13, 2010, which is incorporated herein by reference.

FIELD OF TECHNOLOGY

The present invention relates to a pressure sensor, and, more specifically, relates to a pressure sensor having a diaphragm.

BACKGROUND OF THE INVENTION

Pressure sensors that use a semiconductor piezoresistance effect are small and light, and have high sensitivity, and thus are used broadly in fields such as industrial instrumentation and medicine. In this type of pressure sensor, a diaphragm is formed on a semiconductor substrate. Strain gauges are formed on the diaphragm. The strain gauges are deformed by pressure applied to the diaphragm. The pressure is measured by detecting the changes in resistances in the strain gauges due to the piezoresistance effect.

A pressure sensor wherein a gauge for static pressure detection is positioned optimally in order to reduce crosstalk has been disclosed (Japanese Unexamined Patent Application Publication 2002-277337 ("JP '337")). The pressure sensor of JP '337 is provided with a static pressure detecting gauge towards the outside of a bonding portion between a sensor chip and a pedestal. Specifically, a square differential pressure diaphragm is formed in the center of the sensor chip. Then a differential pressure sensing gauge is provided at an edge portion or the center portion of the differential pressure diaphragm. A static pressure detecting gauge is provided at the outside of the differential pressure diaphragm.

The provision of a static pressure detecting diaphragm on a semiconductor substrate has also been disclosed (Japanese Unexamined Patent Application Publication H6-213746 ("JP '746")). In the pressure sensor in JP '746, an annular static pressure diaphragm is formed on the outer periphery of a circular differential pressure diaphragm. Four static pressure strain gauges are formed on the static pressure diaphragm. The four static pressure strain gauges are disposed with equal spacing in the peripheral direction. That is, two static pressure gauges are disposed across from each other with the diffrential pressure diaphragm interposed therebetween. The static pressure sensitivity can be improved through the formation of a static pressure diaphragm.

As described above, piezoresistive elements wherein the resistance is changed through deformation are used as gauges. That is, the resistance of the piezoresistive element changes in accordance with the deformation of the semiconductor substrate that is produced through the pressure. The pressure can be measured by detecting the magnitude of the variations in the resistances using a bridge circuit.

However, the piezoresistive element is used as the gauge is affected by the ambient temperature in the measurement. For example, a thermal stress will be produced through a difference in the coefficient of thermal expansion between the semiconductor substrate and a glass pedestal, or the like. A strain will be produced in the gauge on the semiconductor substrate due to this thermal stress. As a result, a difference in the ambient measurement temperature may cause measurement error.

Additionally, in pressure sensors it is necessary to make the diaphragm small in order to achieve miniaturization. However, the measurement sensitivity is reduced when the diaphragm is reduced in size. For example, the peak value of the stress is constant when the aspect ratio of the static pressure detecting diaphragm (the ratio of the length and thickness) is constant. However, even if the aspect ratio is held constant, the peak amplitude of the stress is reduced when the diaphragm is made smaller. Because of this, it is difficult to obtain adequate sensitivity. In other words, it is difficult to achieve miniaturization of the pressure sensor when the diaphragm is made larger in order to increase the measurement sensitivity.

In this way, there is a problem in that it is difficult to achieve a small high performance pressure sensor.

The present invention was created in order to solve this type of problem area, and the object thereof is to provide a small high-performance pressure sensor.

SUMMARY OF THE INVENTION

A first pressure sensor according to present invention has a substrate; a differential pressure diaphragm provided in the center portion of the substrate; a differential pressure gauge provided on the differential pressure diaphragm; two static pressure diaphragms provided in the outer peripheral portion of the differential pressure diaphragm; a first static pressure gauge formed at an edge portion of a first static pressure diaphragm of the two static pressure diaphragms; and a second static pressure gauge formed at a center portion of a second static pressure diaphragm of the two static pressure diaphragms. Here the line connecting the center of the differential pressure diaphragm and the center of the first static pressure diaphragm and line connecting the center of the differential pressure diaphragm and the second static pressure diaphragm may be mutually perpendicular.

Moreover, a second pressure sensor according to present invention includes a substrate; a differential pressure diaphragm provided in the center portion of the substrate; a differential pressure gauge provided on the differential pressure diaphragm; one static pressure diaphragm provided in the outer peripheral portion of the differential pressure diaphragm; a first static pressure gauge formed on an edge portion of the static pressure diaphragm; and a second static pressure gauge formed on a center portion of the static pressure diaphragm. Here the first static pressure gauge may be formed at the edge portion of the substrate center side or the edge portion of the substrate edge side of the static pressure diaphragm.

The use of this structure enables the suppression of the reduction in the measurement sensitivity even when the pressure sensor is miniaturized. That is, in the pressure sensor as set forth in the present invention, a first static pressure gauge is formed at an edge portion of a static pressure diaphragm, and a second static pressure gauge is formed in the center portion of the static pressure diaphragm, and thus the change in resistance that is caused by a deformation resulting from the application of pressure will be positive for one of the two static pressure gauges, and negative for the other. Because of this, it is possible to suppress the reduction in measurement sensitivity in relation to static pressure. Additionally, these two static pressure gauges may be disposed at an edge portion and a center portion of a single static pressure diaphragm, making it possible to reduce to one or two the number of static pressure diaphragms, because, at most, two static pressure diaphragms will be sufficient. This makes it possible to achieve miniaturization of the pressure sensor.

Additionally, the use of the structure enables the suppression of measurement error due to temperature variations. That is, in the pressure sensor as set forth in the present invention, a first static pressure gauge is formed at an edge portion of a static pressure diaphragm, and a second static pressure gauge is formed in the center portion of the static pressure diaphragm, and thus the change in resistance that is caused by a stress that is produced when there is a change in temperature will be in the same direction for both of the two static pressure gauges. This makes it possible to suppress variations in output due to temperature variations.

The result is the ability to obtain a small high-performance pressure sensor.

In the pressure sensor according to the present invention, not only may the short directions of the static pressure diaphragms be disposed along the radial direction relative to the center of the differential pressure diaphragm, but also the first and second static pressure gauges may be formed in directions that are perpendicular to the short directions of the static pressure diaphragms.

Additionally, in the pressure sensor according to the present invention, preferably the static pressure diaphragm is formed in a rectangular shape.

Additionally, the static pressure diaphragm may be formed in an annular shape so as to encompass the differential pressure diaphragm. In this case, the static pressure diaphragm may be formed in a circular shape or a polygonal shape, and the annular static pressure diaphragm may be disposed concentrically with a circular or a polygonal differential pressure diaphragm.

Additionally, the substrate may be formed in a circular or polygonal shape.

The present invention is able to provide a small high-performance pressure sensor.

DETAILED DESCRIPTION OF THE INVENTION

In the below, specific forms of embodiment wherein the present invention is applied will be explained in detail while referencing the drawings.

Figure 1:
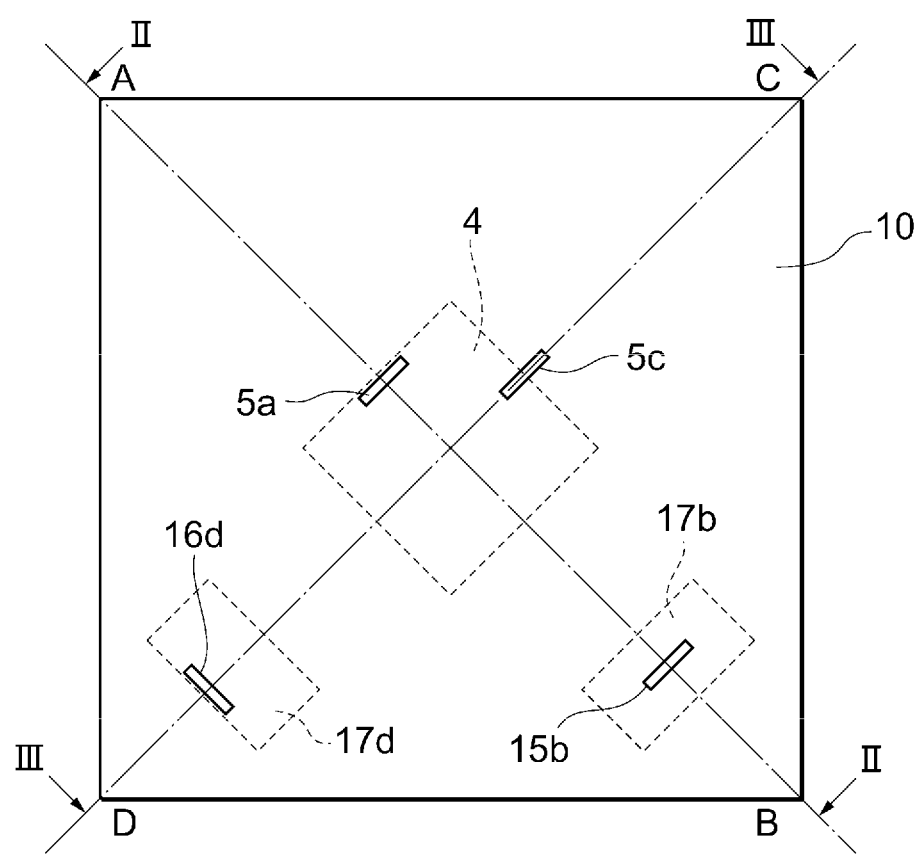
FIG. 1 is a top view illustrating the structure of a pressure sensor according to an example of the present invention.
Figure 2:
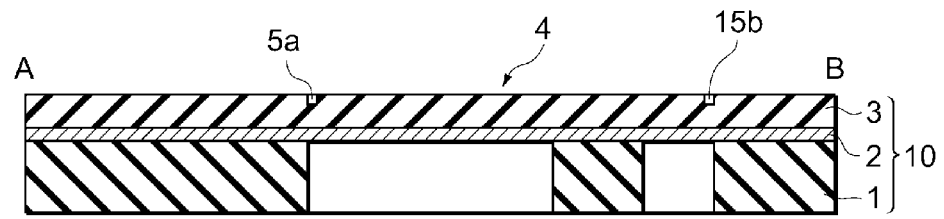
FIG. 2 is a cross-sectional diagram along the section in FIG. 1.
Figure 3:
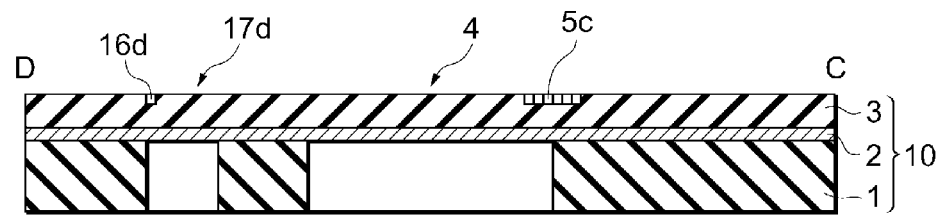
FIG. 3 is a cross-sectional diagram along the section III-III in FIG. 1.

A pressure sensor as set forth in an example of the present invention will be explained first. FIG. 1 is a top view illustrating the structure of a sensor chip used in a pressure sensor according to the example. FIG. 2 is a cross-sectional diagram along the section II-II in FIG. 1, and FIG. 3 is a cross-sectional diagram along the section III-III. The pressure sensor can be a semiconductor sensor that uses the piezoresistance effect of semiconductors.

The pressure sensor has a sensor chip 10 that is made out of a semiconductor substrate. The sensor chip 10 is a square shape. As illustrated in FIG. 1, with each of the corners of a square sensor chip 10 defined as A, B, C, and D, the upper-left corner is defined as corner A, the lower-right corner is defined as corner B, the upper-right corner is defined as corner C, and the lower-left corner is defined as corner D. Additionally, the diagonal line connecting corner A and corner B is defined as the diagonal line AB, and the diagonal line connecting corner C and corner D is defined as the diagonal line CD. The sensor chip 10 is a square, and thus the diagonal line AB and the diagonal line CD bisect each other at right angles.

As illustrated in FIG. 2, the sensor chip 10 has a three-layer structure with a first semiconductor layer 1, which is a base, an insulating layer 2, and a second semiconductor layer 3. For example, an SOI (Silicon On Insulator) substrate, comprising a first semiconductor layer 1, an insulating layer 2 with a thickness of about 0.5 µm, and a second semiconductor layer 3, may be used as the sensor chip 10. The first semiconductor layer 1 and the second semiconductor liner 3 may be structured from, for example, n-type single crystal silicon layers. The insulating layer 2 may be structured from, for example, an $SiO_2$ layer. The insulating layer 2 is formed on top of the first semiconductor layer 1. Additionally, the second semiconductor layer 3 is formed on top of the insulating layer 2. Consequently, the insulating layer 2 is disposed between the first semiconductor layer 1 and the second semiconductor layer 3. The insulating layer 2 functions as an etching stopper when etching the first semiconductor layer 1. The second semiconductor layer 3 structures a differential pressure diaphragm 4. As illustrated in FIG. 1 and FIG. 2, the differential pressure diaphragm 4 is disposed in the center part of the chip.

The differential pressure diaphragm 4, for detecting a differential pressure, is disposed in the center part of the sensor chip 10. As illustrated in FIG. 2, the differential pressure diaphragm 4 is formed by removing the first semiconductor layer 1. That is, the sensor chip 10 is thinned at the differential pressure diaphragm 4. As illustrated in FIG. 1, here the differential pressure diaphragm 4 is formed in the shape of a square. Additionally, the center of the differential pressure diaphragm 4 is coincident with the center of the sensor chip 10. That is, the center point of the sensor chip 10 is on the point of intersection between the diagonal line AB and the diagonal line CD. Additionally, the differential pressure diaphragm 4 is disposed angled at 45° relative to the square sensor chip 10. Consequently, the diagonal line AB passes perpendicularly through the centers of two opposing edges of the differential pressure diaphragm 4. Additionally, the diagonal line CD passes perpendicularly through the centers of the other two opposing edges of the differential pressure diaphragm 4.

Differential pressure gauges 5a and 5c are disposed on the surface of the differential pressure diaphragm 4. These two differential pressure gauges 5a and 5c are referred to, in aggregate, as the differential pressure gauges 5. The differential pressure gauges 5 are disposed at the edge portions of the differential pressure diaphragm 4. That is, the differential pressure gauges 5 are formed on the peripheral edge portions of the differential pressure diaphragm 4. Here differential pressure gauges 5 are disposed on two edges of the square differential pressure diaphragm 4. Differential pressure gauges 5 are disposed in the centers of the two edges of the differential pressure diaphragm 4. The differential pressure gauge 5a is disposed between the center of the differential pressure diaphragm 4 and the corner A, and the differential pressure gauge 5c is disposed between the center of the differential pressure diaphragm 4 and the corner C.

The differential pressure gauges 5 are strain gauges having the piezoresistance effect. Consequently, when the sensor chip 10 deforms, the resistances of each of the differential pressure gauges 5a and 5c will change. Note that, on the top surface of the sensor chip, interconnections (not shown) are formed connecting the individual differential pressure gauges 5a and 5c. For example, interconnections are connected to both ends of each of the differential pressure gauges 5a and 5c. The two differential pressure gauges 5 are connected in a bridge circuit by these interconnections. The differential pressure diaphragm 4 deforms due to a pressure differential between the spaces partitioned by the differential pressure diaphragm 4. In the differential pressure gauges 5, the resistances vary in accordance with the amount of deformation of the differential pressure diaphragm 4. The pressure can be measured by detecting these variations in the resistances. The differential pressure gauges 5 are formed on the surface of the sensor chip 10 as illustrated in FIG. 2 and FIG. 3.

The two differential pressure gauges 5a and 5c are disposed in parallel with each other. That is, the lengthwise directions of the two differential pressure gauges 5a and 5c are disposed along the diagonal line CD. Additionally, interconnections (not shown) are connected to both ends of the differential pressure gauges 5a and 5c in the lengthwise direction. The differential pressure gauges 5 are formed in parallel to the <110> crystal axial direction wherein the piezoresistance factor is maximized in the (100) crystal face orientation of the sensor chip 10.

Moreover, two static pressure diaphragms 17b in 17d are provided in the sensor chip 10. These two static pressure diaphragms 17b and 17d are referred to, in aggregate, as the static pressure diaphragms 17. As illustrated in FIG. 2 and FIG. 3, the static pressure diaphragms are formed by removing the first semiconductor layer 1. That is, the sensor chip 10 is thinned at the static pressure diaphragms 17. The static pressure diaphragms 17 are disposed at the peripheral portion of the differential pressure diaphragm 4 (that is, to the outside of the differential pressure diaphragm 4).

The static pressure diaphragm 17b, as illustrated in FIG. 1, is disposed between the center point of the sensor chip 10 (the intersection between the diagonal line AB and the diagonal line CD) and the corner B on the diagonal line AB. That is, the static pressure diaphragm 17b is disposed on the opposite side from the differential pressure gauge 5a across the center point of the sensor chip 10. On the other hand, the static pressure diaphragm 17d, as illustrated in FIG. 1, is disposed between the center point of the sensor chip 10 and the corner D on the diagonal line CD. That is, the static pressure diaphragm 17d is disposed on the opposite side from the differential pressure gauge 5c across the center point of the sensor chip 10. The static pressure diaphragms 17b and 17d are of identical sizes and shapes.

The static pressure diaphragms 17 are formed in rectangular shapes. Consequently, the long edges and the short edges of the static pressure diaphragms 17 are perpendicular to each other. That is, the static pressure diaphragms 17 have long directions and short directions. Here let us define the direction extending towards an outer edge from the center point of the sensor chip 10 as the radial direction (the r direction). That is, the direction towards the edge of the sensor chip 10 from the center point of the sensor chip 10 is the radial direction. Because the center points of the sensor chip 10 and the differential pressure diaphragm 4 are coincident, the radial direction is the radial direction with respect to the center of the differential pressure diaphragm 4. Let us define the direction perpendicular to the radial direction as the circumferential direction (the θ direction). The circumferential direction corresponds to the direction of the tangent of the circle centered on the center point of the sensor chip 10. The short edges of the static pressure diaphragms 17 are parallel to the radial direction. The short edge of the static pressure diaphragm 17b is parallel to the diagonal line AB, and the short edge of the static pressure diaphragm 17d is parallel to the diagonal line CD. Consequently, the short directions of the two static pressure diaphragms 17b and 17d are perpendicular to each other. Moreover, the long directions and the circumferential directions of the static pressure diaphragms 17 are parallel on the diagonal line AB and the diagonal line CD.

The static pressure gauge 15b is formed on the static pressure diaphragm 17b, and the static pressure gauge 16d is formed on the static pressure diaphragm 17d. The static pressure gauges 15b and 16d are strain gauges, in the same manner as the differential pressure gauges 5. Consequently, when the sensor chip 10 deforms, the resistances of each of the static pressure gauges 15b and 16d will change due to the piezoresistance effect. The static pressure gauges 15b and 16d are connected to a bridge circuit, in the same manner as the differential pressure gauges 5. Doing so makes it possible to measure the static pressure. Note that the static pressure gauges 15b and 16d are formed on the surface of the sensor chip 10 as illustrated in FIG. 2 and FIG. 3. Additionally, interconnections (not shown) are connected to both ends of the static pressure gauges 15b and 16d in the lengthwise direction. Furthermore, the static pressure gauges 15b and 16d are connected to a bridge circuit, in the same manner as the differential pressure gauges 5.

The static pressure gauge 15b is formed on the diagonal line AB, and the static pressure gauge 16d is formed on the diagonal line CD. The static pressure gauge 15b corresponds to the second static pressure gauge as set forth in the present invention, and is disposed in the center portion of the static pressure diaphragm 17b. On the other hand, the static pressure gauge 16d corresponds to the first static pressure gauge as set forth in the present invention, and is disposed at an edge portion of the static pressure diaphragm 17d. Here, the static pressure gauge 16d is formed on the sensor chip edge side on the peripheral edge (on the long edge on the corner D side) of the static pressure diaphragm 17d.

The distance from the center point of the sensor chip 10 to the static pressure gauge 15b is shorter than the distance from the center point of the sensor chip 10 to the static pressure gauge 16d. Note that the static pressure gauge 16d may instead be disposed on the long edge on the center side of the sensor chip 10. Additionally, while in the present form of embodiment, the static pressure gauge 16d is formed on the long edge of the static pressure diaphragm 17d, there is no limitation to the long edge, but instead it may be formed towards the chip center side the static pressure diaphragm 17d or may be formed in a location wherein large stresses are produced in the vicinity of the edge portion of the chip edge side.

In this way, the disposal positions of the static pressure gauges on the static pressure diaphragms 17 are varied by the static pressure gauge 15b and the static pressure gauge 16d. That is, the static pressure gauge 15b is disposed at the center portion of the static pressure diaphragm 17b, and the static pressure gauge 16d is disposed at the edge portion of the static pressure diaphragm 17d. Doing so makes it possible to prevent a reduction in measurement sensitivity, even when the sensor chip 10 is miniaturized. Moreover, this can prevent measurement error due to changes in temperature in the measurement environment. That is, this makes it possible to improve the thermal characteristics of the pressure sensor. The structure set forth above is able to achieve a small high-performance pressure sensor.

Figure 4:
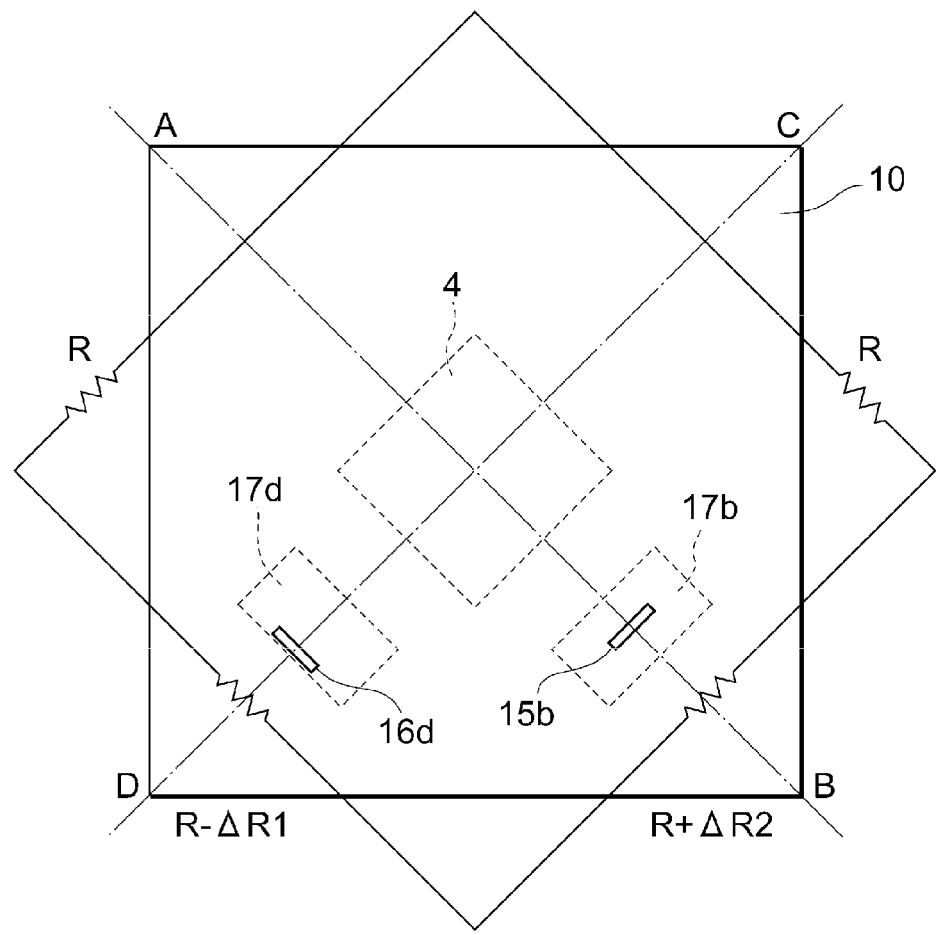
FIG. 4 is a schematic diagram illustrating a bridge circuit structured from static pressure gauges and the resistance variations when pressure is applied thereto.
Figure 5:
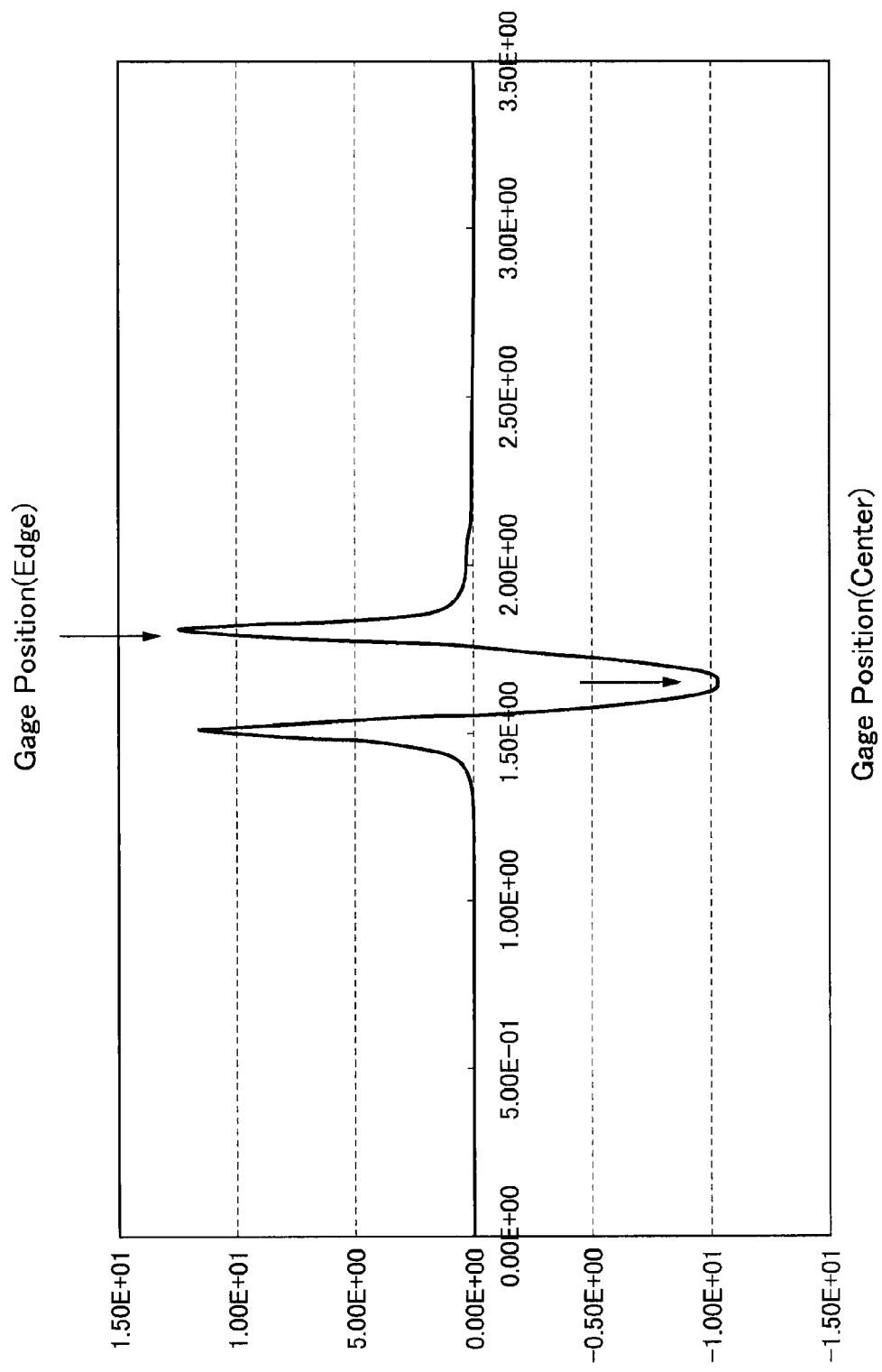
FIG. 5 is a stress distribution diagram, from the center of the sensor chip, when pressure is applied.

The reason why this is able to prevent a reduction in the measurement sensitivity will be explained first using FIG. 4 and FIG. 5. FIG. 4 is a schematic diagram illustrating the bridge circuit structured by the static pressure gauges 15b and 16d, and the variations in resistances thereof. As illustrated in FIG. 4, the two static pressure gauges 15b and 16d and two external fixed resistances are resistive elements, and structure, for example, a Wheatstone bridge. FIG. 5 is a diagram illustrating the stress distribution, from the center point of the sensor chip 10, when a 3.5 MPa pressure is applied. Note that FIG. 5 shows the result of a simulation of the pressure on the diagonal line CD. The finite element method (FEM) was used in the analysis in the simulation. In FIG. 5, the horizontal axis shows the distance from the center of the sensor chip 10, and the vertical axis shows the stress. In FIG. 5, the arrow on the left side corresponds to the position of the center of the static pressure diaphragm 17 and the arrow on the right side corresponds to the outside edge of the static pressure diaphragm 17.

When pressure is applied, the stresses produced at the center portion and at the edge portion of the static pressure diaphragm 17 are in opposite directions. If, for example, a pressure of 3.5 Mpa is applied, then, as illustrated in FIG. 5, the stress will be negative at the center portion (the arrow on the left side) of the static pressure diaphragm 17, and the stress will be positive at the edge portion (the arrow on the right side). That is, the stress has a negative peak at the center portion of the static pressure diaphragm 17, and a positive peak at the edge portion.

As illustrated in FIG. 4, the resistance values of the static pressure gauges 15b and 16d at the reference pressure are identical to the value R of the resistance values of the external fixed resistances. Let us define the absolute value of the change in the resistance of the static pressure gauge 16d caused by the strain produced by the application of the pressure as $\Delta R1$ and the absolute value of the change in resistance of the static pressure gauge 15b as $\Delta R2$. Given this, the resistance value of the static pressure gauge 16d that is disposed at the edge portion of the static pressure diaphragm 17 will be $R-\Delta R1$. On the other hand, the resistance value of the static pressure gauge 15b that is disposed at the center portion of the static pressure diaphragm 17 will be $R+\Delta R2$. Note that both $\Delta R1$ and $\Delta R2$ are positive values. That is, when the pressure is applied, the resistance value of the static pressure gauge 16d, which corresponds to the first static pressure gauge, goes down, and the resistance value of the static pressure gauge 15b, which corresponds to the second static pressure gauge, goes up.

In this way, the resistance balance of the bridge circuit is disrupted when there is a change from the reference pressure, and the signs of the values of the changes in resistances are in opposite directions for the static pressure gauge 15b and the static pressure gauge 16d. That is, the change in resistance of one of the two static pressure gauges 15b and 16d will be positive, and the change in resistance of the other will be negative. As a result, the output of the bridge will become larger, increasing the sensitivity of the measurement relative to the pressure. Moreover, the static pressure gauges 15b and 16d are formed along the long edge of the static pressure diaphragm 17. As illustrated in FIG. 5, the stresses that are produced peak at the edge and the center of the static pressure diaphragm 17. Given this, the static pressure gauges 15b and 16d are formed along the long direction of the static pressure diaphragm 17 at the edge and the center thereof. The change in the resistance value that is detected by the bridge circuit is a value that integrates along the lengthwise direction. As a result, the stresses that are produced can be converted efficiently into a change in the resistance value. Doing so makes it possible to increase the measurement sensitivity.

Figure 6:
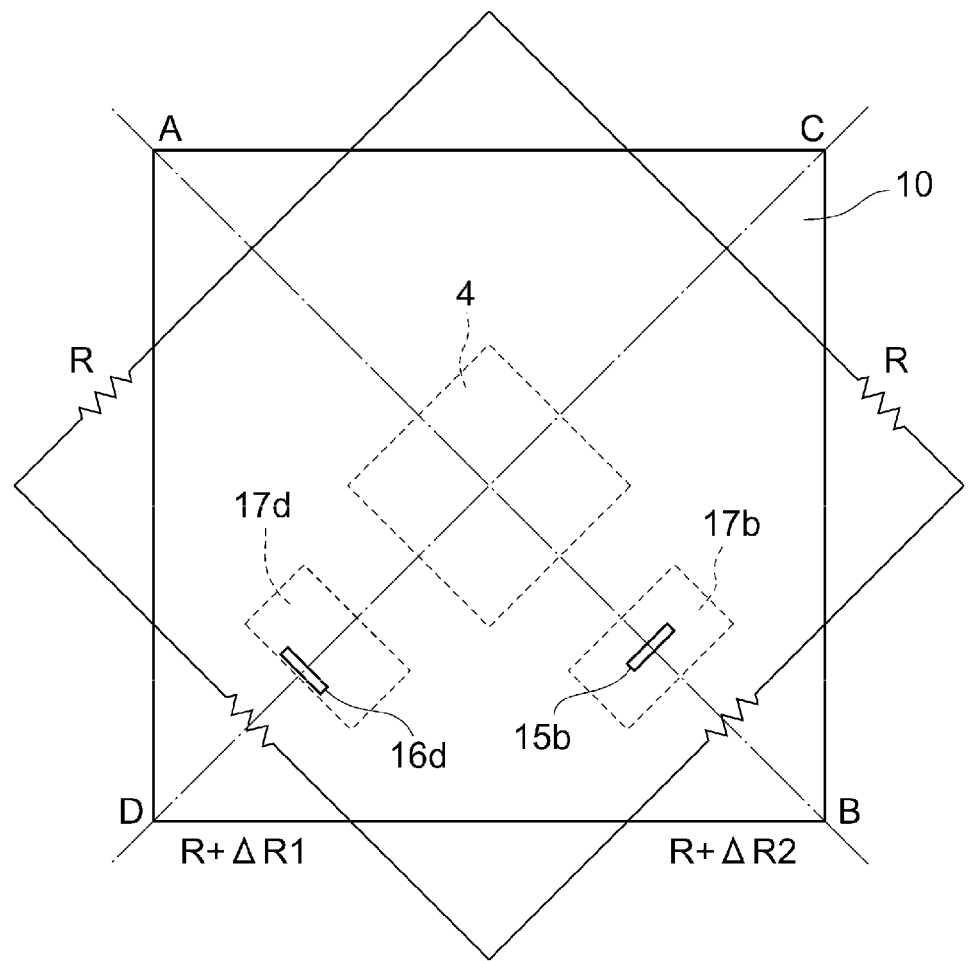
FIG. 6 is a schematic diagram illustrating a bridge circuit structured from static pressure gauges and the resistance variations when a temperature is applied thereto.
Figure 7:
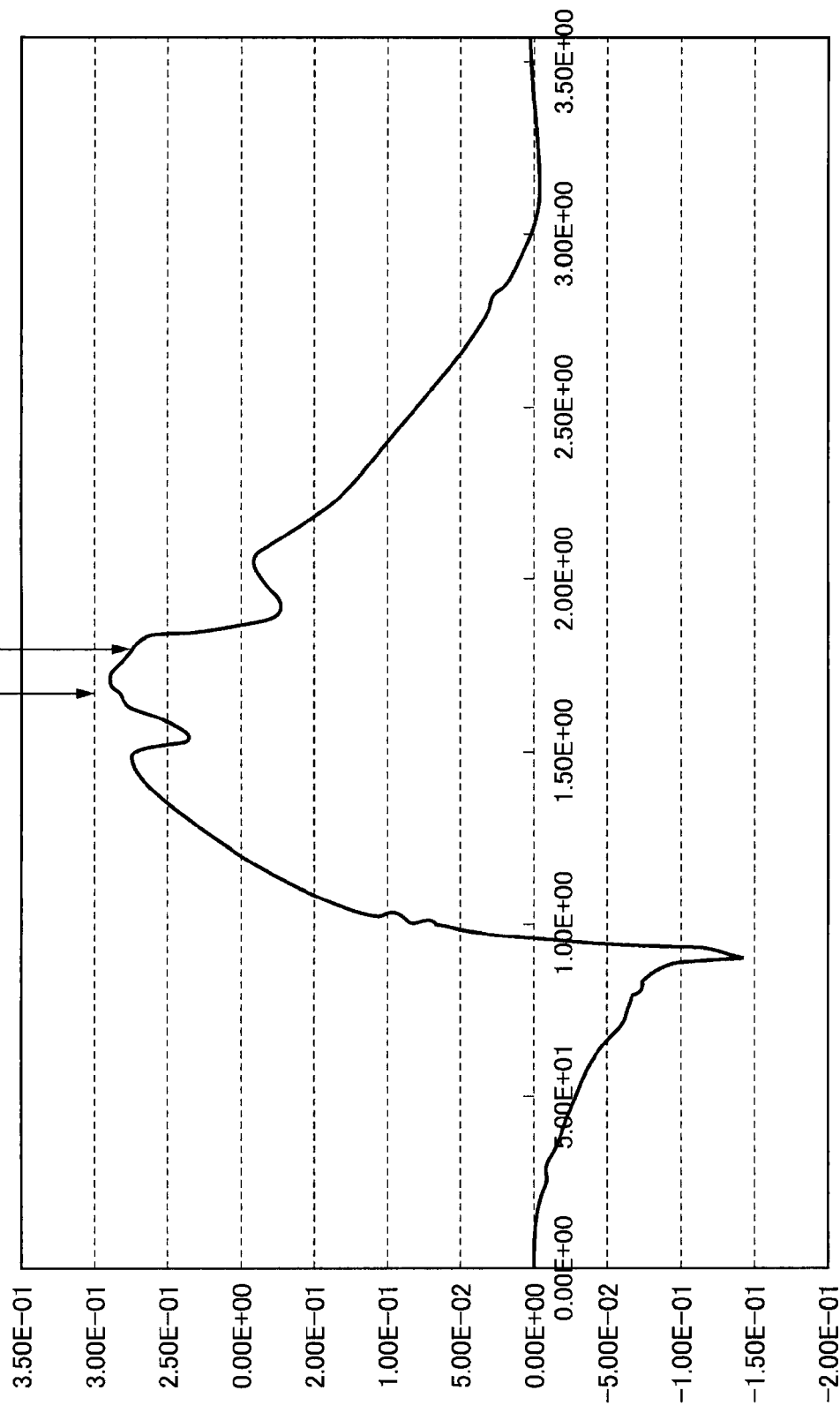
FIG. 7 is a stress distribution diagram, from the center of the sensor chip, when a temperature is applied.

The reason why it is possible to suppress the measurement error due to changes in temperature in the measuring environment will be explained next using FIG. 6 and FIG. 7. As with FIG. 4, FIG. 6 is a schematic diagram illustrating the bridge circuit structured by the static pressure gauges 15b and 16d, and the variations in resistances thereof. FIG. 7 is a diagram illustrating the stress distribution, from the center point of the sensor chip 10, when a −40° C. temperature is applied. Note that FIG. 7 shows the result of a simulation of the pressure on the diagonal line CD. The finite element method (FEM) was used in the analysis in the simulation. In FIG. 7, the horizontal axis shows the distance from the center point of the sensor chip 10, and the vertical axis shows the stress. In FIG. 7, the arrow on the left side corresponds to the position of the center of the static pressure diaphragm 17 and the arrow on the right side corresponds to the outside edge of static pressure diaphragm 17.

The changes in the values of the resistances caused by the stresses produced when there is a change in temperature are both in the same direction. That is, as illustrated in FIG. 7, the stresses are produced in the same direction at the edge and the center of the static pressure diaphragm 17. For example, if a compressive stress is produced at the edge of the static pressure diaphragm 17 due to a change in temperature, then a compressive stress will be produced also at the center of the static pressure diaphragm 17. If a tensile stress is produced at the edge of the static pressure diaphragm 17 due to a change in temperature, then a tensile stress will be produced also at the center of the static pressure diaphragm 17. Consequently, the resistance value of the static pressure gauge 16d will be $R+\Delta R1$ and the resistance value of the static pressure gauge 15b will be $R+\Delta R2$. Note that $\Delta R1$ and $\Delta R2$ are positive numbers. Consequently, even when there is a change in temperature, the change in the bridge output will be reduced. That is, the variation in the output due to the variation in temperature is suppressed. This makes it possible to suppress measurement error due to temperature variations. Doing so makes it possible to improve the thermal characteristics.

The arrangement of the static pressure gauges 15b and 16d and the static pressure diaphragm 17 as set forth above enables the achievement of a small high-performance pressure sensor. Moreover, while in the explanation above the explanation was for a rectangular static pressure diaphragm 17, the shape of the static pressure diaphragm 17 is not limited to being rectangular. For example, the static pressure diaphragm may be elliptical, or the like, instead. Furthermore, while in the explanation above static pressure diaphragms 17 were provided in the vicinity of two corners of the sensor chip 10 (locations corresponding to the static pressure gauges 15b and 16d), it may instead be formed in an annular shape or a polygonal shape that is continuous in the circumferential direction.

Figure 8:
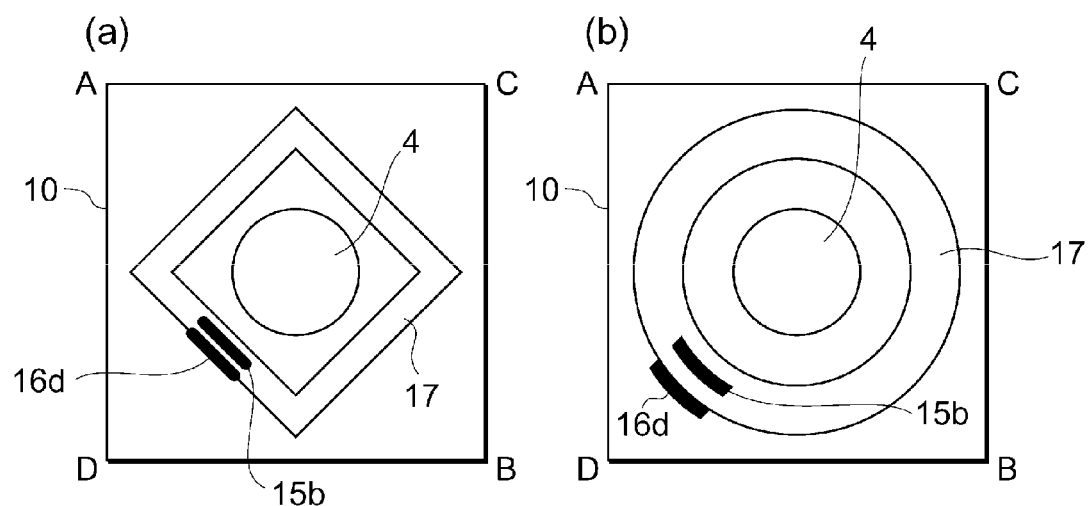
FIG. 8 is a top view illustrating a different structure of a pressure sensor according to an example of the present invention.

For example, as illustrated in FIG. 8 (a), the static pressure diaphragm 17 may be formed as a square frame. Moreover, as illustrated in FIG. 8 (b), the differential pressure diaphragm 4 may be circular with the static pressure diaphragm 17 having an annular shape, with the static pressure diaphragm 17 encompassing the differential pressure diaphragm 4. That is, the static pressure diaphragm 17 may be formed as a groove surrounding the differential pressure diaphragm 4. In other words, may be any shape having a long direction and a short direction. Additionally, it may be arranged with the short direction, which is perpendicular to the long direction, along the radial direction. The long directions of the static pressure gauges 15b and 16d are arranged along the long direction of the static pressure diaphragm 17. That is, the long directions of the pressure gauges 15b and 16d are arranged along the circumferential direction.

Additionally, while in the explanation above the substrate and the differential pressure diaphragm 4 were squares, there is no limitation thereto, and they may instead be circular. Additionally, while in the explanation above the static pressure diaphragms 17 were arranged so that the line connecting the center of the differential pressure diaphragm 4 (the center of the sensor chip 10) and the center of the static pressure diaphragm 17b and the line connecting the center of the differential pressure diaphragm 4 and the center of the static pressure diaphragm 17d are perpendicular to each other, there is no limitation thereto. For example, the arrangement may be such that the static pressure diaphragm 17b and the static pressure diaphragm 17d face each other with the differential pressure diaphragm 4 interposed therebetween, with the center of the static pressure diaphragm 17b, the center of the differential pressure diaphragm 4, and the center of the differential static pressure diaphragm 17d all on the same line.

Figure 9:
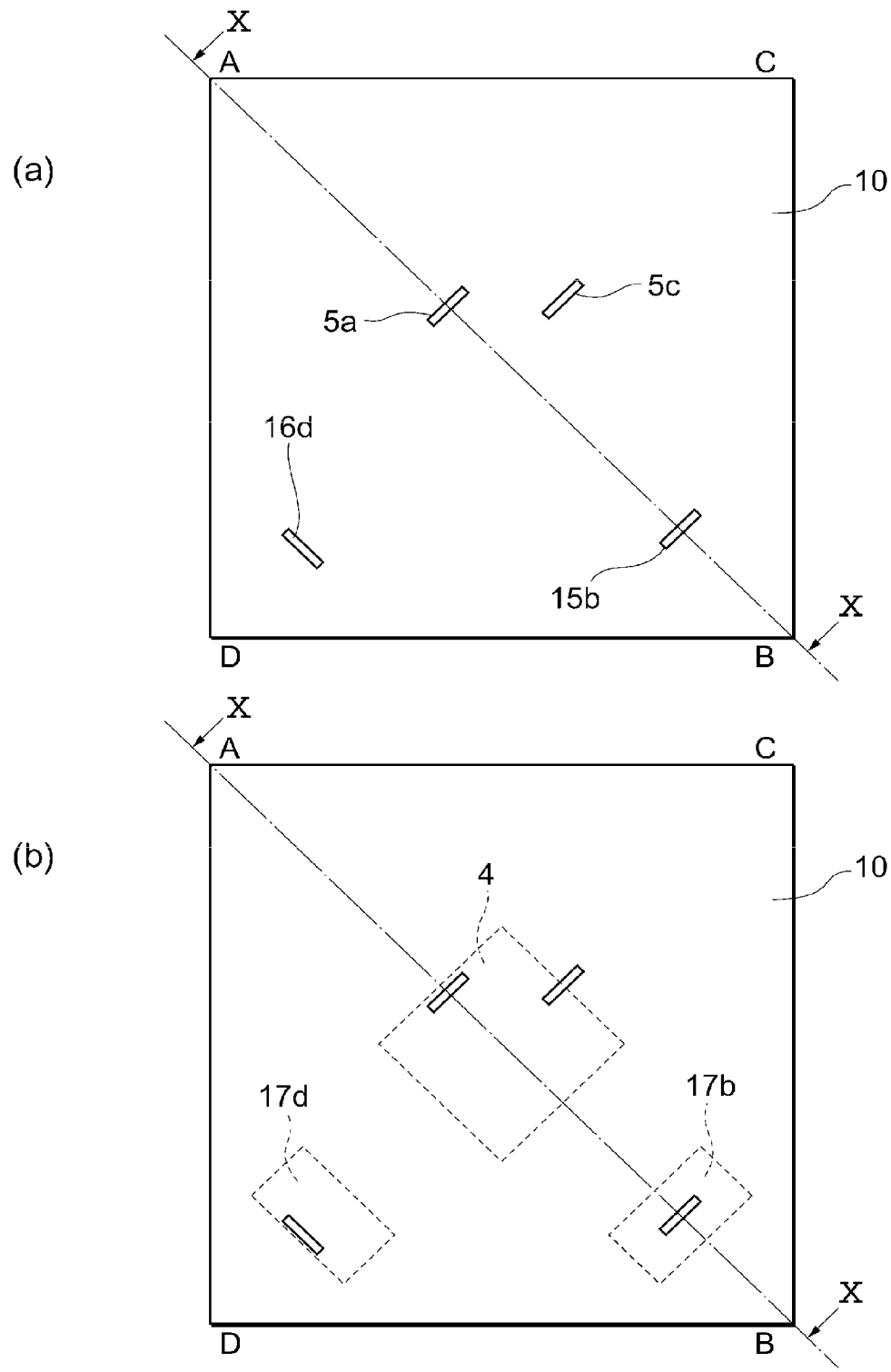
FIG. 9 is a diagram illustrating the manufacturing process for the pressure sensor.
Figure 10:
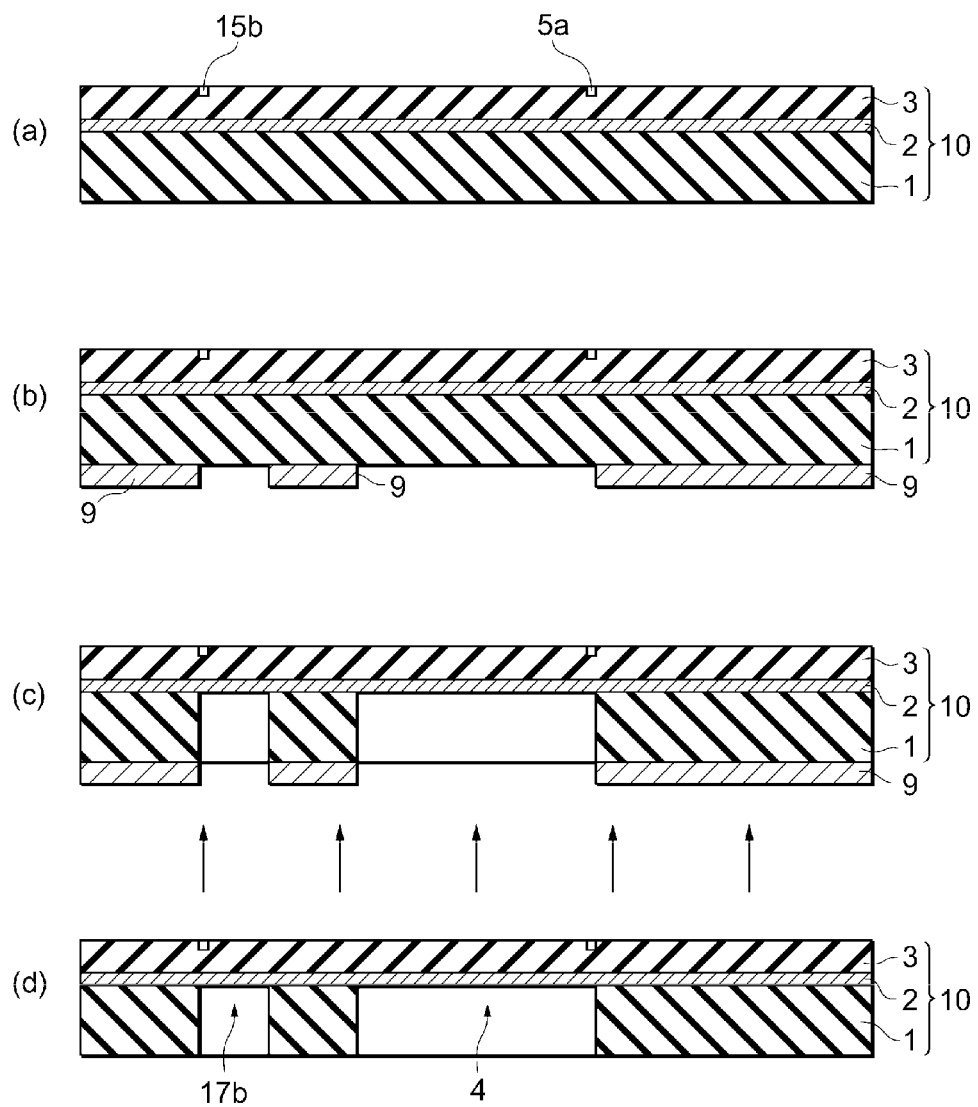
FIG. 10 is a process cross-sectional diagram illustrating the manufacturing process for the pressure sensor.

The method for manufacturing the pressure sensor will be explained next using FIG. 9 and FIG. 10. FIG. 9 is a diagram illustrating a method for manufacturing the pressure sensor, and shows the structure when the sensor chip 10 is viewed from above. FIG. 10 is a diagram illustrating a method for manufacturing the pressure sensor, showing the structure of the section X-X in FIG. 9.

First, an SOI (Silicon On Insulator) wafer, comprising a first semiconductor layer 1, an insulating layer 2 with a thickness of about 0.5 μm, and a second semiconductor layer 3, is prepared. In manufacturing this SOI wafer, the SIMOX (Separation by IMplanted OXygen) technology wherein an $SiO_2$ layer is formed through implanting oxygen into a silicon substrate, may be used, the SDB (Silicon Direct Bonding) technology wherein two selecting substrates are bonded together, may be used, or another method may be used. Note that the second semiconductor layer 3 may be planarized and thinned. For example, the second semiconductor layer 3 may be polished to a specific thickness using a polishing method known as CCP (Computer-Controlled Polishing).

The differential pressure gauges 5a and 5c, and the static pressure gauges 15b and 16d are formed from p-type silicon, through an impurity diffusing method or an ion implantation method, on the top surface of the second semiconductor layer 3. Doing so forms the structure illustrated in FIG. 9 (a) and FIG. 10 (a). As illustrated in FIG. 1, and the like, each gauge is formed in a specific position of the location that will form each diaphragm. Note that the differential pressure gauges 5b and 5c and the static pressure gauges 15b and 16d may instead be formed after the diaphragm forming process set forth below. Of course, the differential pressure gauges 5 and the static pressure gauges 15b and 16d may be given mutually differing characteristics.

A resist 9 is formed on the bottom surface of the SOI wafer that is fabricated in this way. The pattern of the resist 9 is formed on the first semiconductor layer 1 through a well-known photolithography process. That is, a photosensitive resin layer is coated, exposed, and developed to form a pattern in the resist 9. The resist 9 has opening portions at parts that correspond to the pressure sensitive regions (the regions wherein the diaphragms will be formed). That is, the first semiconductor layer 1 is exposed in the parts wherein the diaphragms will be formed. Doing so forms the structure illustrated in FIG. 10 (b).

The first semiconductor layer 1 is etched using the resist 9 as a mask. Doing so forms the structure illustrated in FIG. 9 (b) and FIG. 10 (c). Dry etching, for example, the well-known ICP etching, or the like, may be used to etch the first semiconductor layer 1. Of course, the first semiconductor layer 1 may instead be etched using a wet etching method that uses a solution such as KOH or TMAH. The differential pressure diaphragm 4 and the static pressure diaphragm are formed when the first semiconductor layer is etched. Here the insulating layer 2 functions as an etching stopper. Consequently, the insulating layer 2 is exposed in the opening portions of the resist 9.

The structure illustrated in FIG. 10 (d) is then formed when the resist 9 is removed. Thereafter, the interconnections (not shown) for achieving electrical connections between the static pressure gauges 15b and 16d and the differential pressure gauges 5 are deposited using vapor deposition. Doing so forms the sensor chip 10. Note that the process for forming the interconnections may be performed instead prior to FIG. 10 (d). For example, the interconnections may be formed prior to FIG. 10 (a), or may be formed between FIG. 10 (a) and FIG. 10 (c). Additionally, as described above, the formation of the static pressure gauges 15b and 16d and the differential pressure gauges 5 may be performed after FIG. 10 (d), or may be performed between FIG. 10 (a) and FIG. 10 (d). That is, there is no particular limitation to the sequence of the interconnection forming process and the strain gauge forming process.

This sensor chip 10 is bonded to a pedestal. The pedestal is formed from Pyrex® glass or a ceramic. The pedestal may be bonded to the first semiconductor layer 1 of the sensor chip 10 using anode bonding, for example. A through hole that arrives at the differential pressure diaphragm 4 is formed in the center of the pedestal. The through hole penetrates to the differential pressure diaphragm 4. Moreover, a raised portion is formed in the center portion of the pedestal and recessed portions are formed at the outer peripheral portion thereof, so that the locations wherein the static pressure diaphragms 17 are formed are non-contact portions. Consequently, the boundary between the raised portion and the recessed portion of the pedestal is disposed between the differential pressure diaphragm 4 and the static pressure diaphragms 17. The manufacturing of the pressure sensor is completed in this way. The pressure sensor fabricated in this way is small and has high performance.

Note that while in the explanation above the static pressure diaphragms 17 and the differential pressure diaphragm 4 were formed simultaneously, they may instead be formed separately. That is, the differential pressure diaphragm 4 and the static pressure diaphragms 17 may be formed in different etching steps. This method for manufacturing will be explained next using FIG. 11 and FIG. 12.

Figure 11:
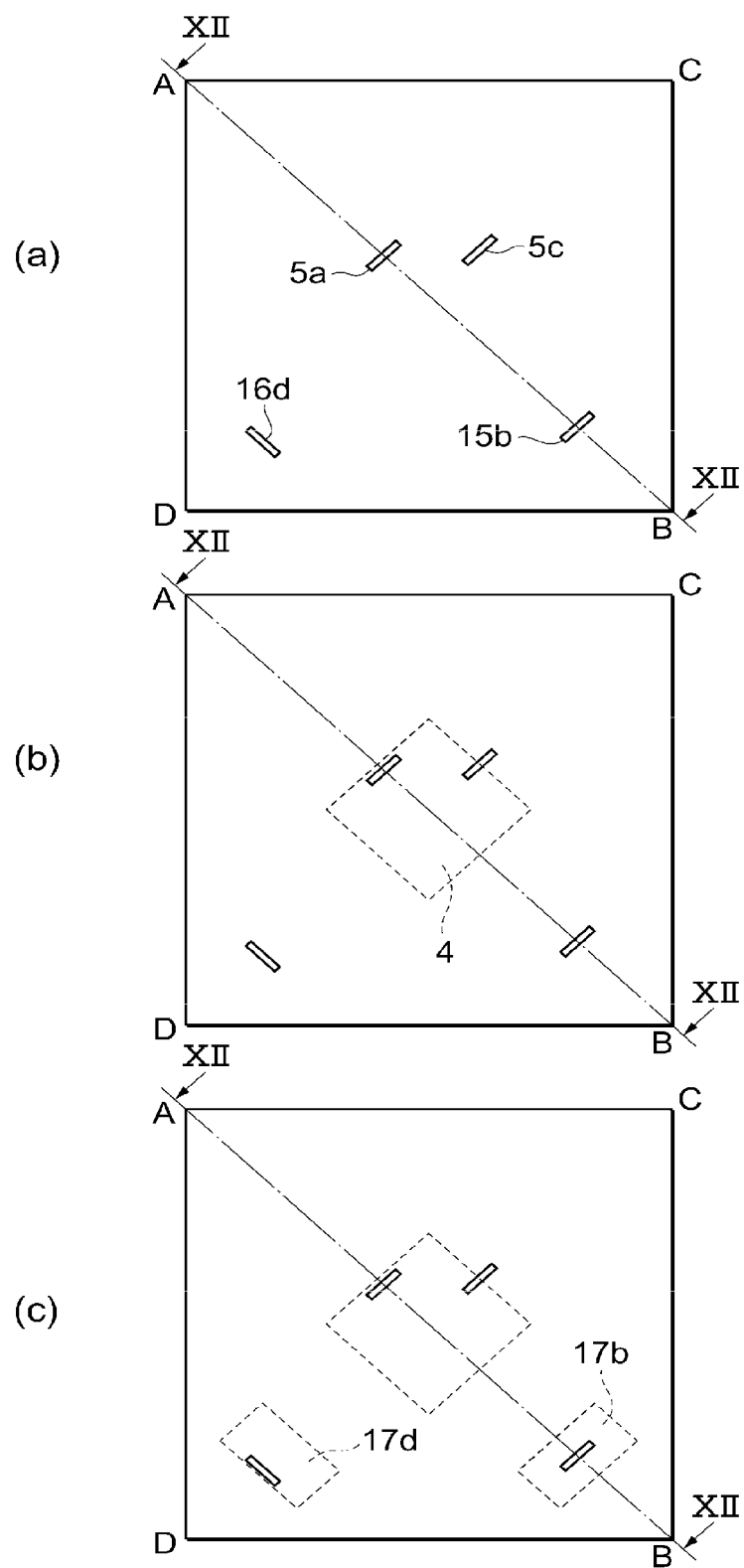
FIG. 11 is a diagram illustrating another manufacturing process for the pressure sensor.
Figure 12:
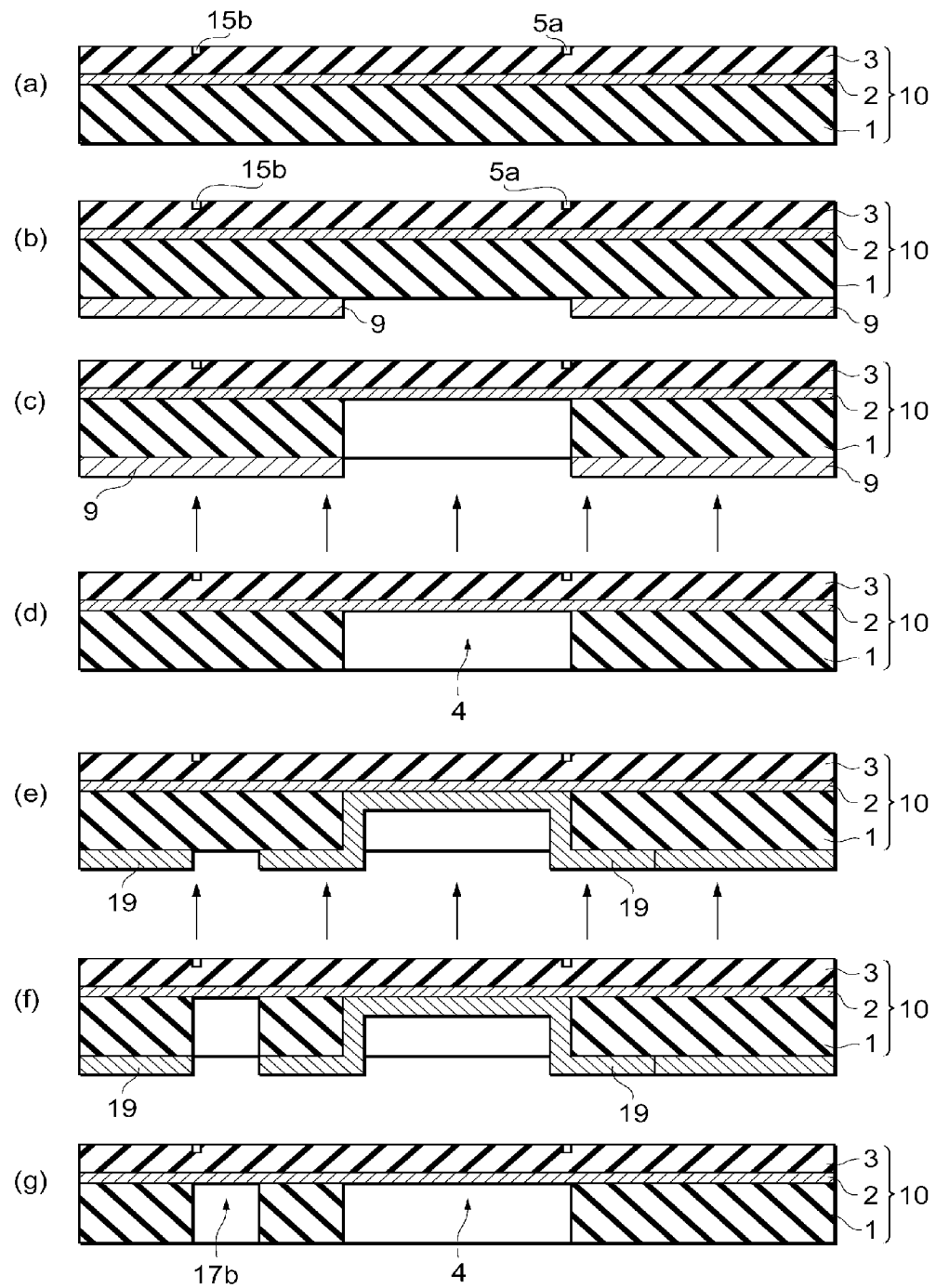
FIG. 12 is a process cross-sectional diagram illustrating another manufacturing process for the pressure sensor.

FIG. 11 is a diagram illustrating another method for manufacturing the pressure sensor, and shows the structure when the sensor chip 10 is viewed from above. FIG. 12 is a diagram illustrating another method for manufacturing the pressure sensor, showing the structure of the section XII-XII in FIG. 11. Note that for those details that are identical to the details explained using FIG. 9 and FIG. 10 the explanations will be omitted.

As illustrated in FIG. 11 (*a*) and FIG. 12 (*a*), a wafer that becomes the sensor chip is prepared. This wafer is identical to that in FIG. 9 (*a*). A resist 9 is formed into a pattern on the first semiconductor layer 1. Doing so forms the structure illustrated in FIG. 12 (*b*). Here, the resist 9 has an opening portion so as to expose the part wherein the differential pressure diaphragm 4 is formed. That is, the locations where the static pressure diaphragms 17 are formed are covered by the resist 9.

The first semiconductor layer 1 is etched using the resist 9 as a mask. Doing so forms the structure illustrated in FIG. 12 (*c*). Here, as described above, the insulating layer 2 is an etching stopper. The structure illustrated in FIG. 12 (*d*) and FIG. 11 (*h*) is then formed when the resist 9 is removed. The differential pressure diaphragm 4 is formed here. Note that in this step the locations that will become the static pressure diaphragms 17 are covered by the resist 9. Consequently, the static pressure diaphragms 17 are not formed. The structure illustrated in FIG. 11 (*a*) and FIG. 12 (*d*) is then formed when the resist 9 is removed.

Following this, a resist 19 is formed into a pattern on the first semiconductor layer 1. Doing so forms the structure illustrated in FIG. 12 (*e*). This resist 19 has opening portions in the locations that will become the static pressure diaphragms 17. That is, the first semiconductor layer 1 is exposed in the regions wherein the static pressure diaphragms 17 will be formed. On the other hand, in the region where the differential pressure diaphragm 4 was formed, the insulating layer 2 is covered by the resist 19. The first semiconductor layer 1 is etched using the resist 19 as a mask. Doing so forms the static pressure diaphragms 17, to form the structure illustrated in FIG. 12 (*f*). Here the insulating layer 2 is used as an etching stopper.

The structure illustrated in FIG. 11 (*c*) and FIG. 12 (*g*) is then formed when the resist 19 is removed. Doing so completes the sensor chip 10.

In this way, the static pressure diaphragms 17 and the differential pressure diaphragm 4 may be formed in separate etching steps. Doing so makes it possible to cause the thicknesses of the static pressure diaphragms 17 to be different from the thickness of the differential pressure diaphragm 4. In other words, this makes it easy to control the thicknesses of the static pressure diaphragms 17 and the thickness of the differential pressure diaphragm 4. For example, this makes it possible to optimize the individual thicknesses of the differential pressure diaphragm 4 and the static pressure diaphragms 17. This makes it possible to manufacture easily a pressure sensor wherein the respective diaphragm thicknesses have been optimized. That is, this makes it possible to manufacture a pressure sensor wherein the thicknesses of the differential pressure diaphragm 4 and the static pressure diaphragms 17 are different. In this case, in at least one of the etching steps the etching is terminated before the insulating layer 2 is exposed.

Figure 13:
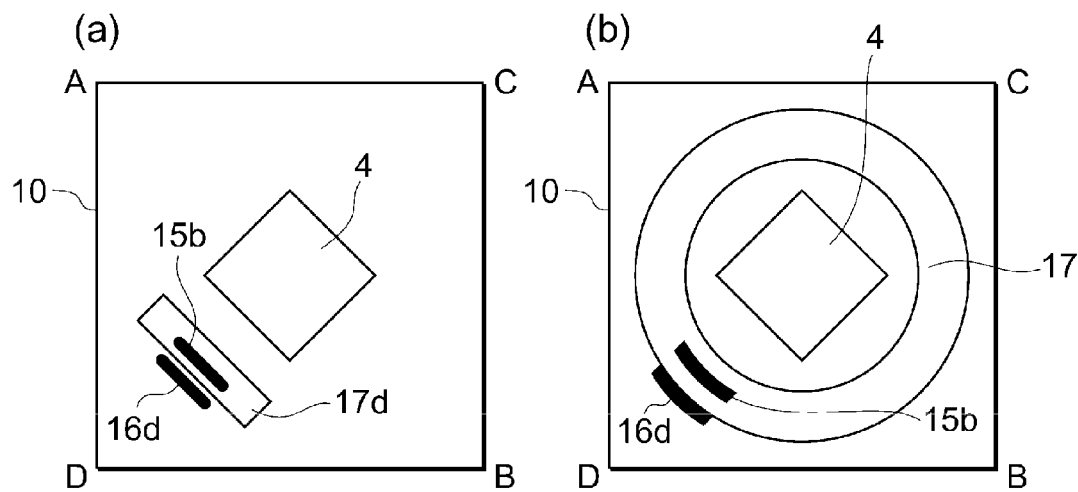
FIG. 13 is a top view illustrating the structure of a pressure sensor according to another example of the present invention.

FIG. 13 will be used to explain a pressure sensor as set forth in another example of the present invention, FIG. 13 is a top view illustrating the structure of a sensor chip 10 used in a pressure sensor according to the present example. As illustrated in FIG. 13 (*a*), static pressure gauges are arranged at two points. That is, two static pressure gauges are arranged in the vicinity of the corner D of the sensor chip 10. Note that the other structures are identical to those above, and thus explanations thereof will be omitted.

As illustrated in FIG. 13 (*a*), static pressure gauges 15*b* and 16*d* are formed in a single static pressure diaphragm 17*d*. Given this, the static pressure gauge 15*b* is disposed at the center portion of the static pressure diaphragm 17*d*, and the static pressure gauge 16*d* is disposed at the edge portion of the static pressure diaphragm 17*d*. In the structure illustrated in FIG. 13 (*a*), the static pressure diaphragm 17*b* is unnecessary, making it possible to achieve further miniaturization of the sensor chip 10 (and of the pressure sensor). The same effect as in the above example can be obtained in this structure as well.

Moreover, as illustrated in FIG. 13 (*b*), the static pressure diaphragm 17 may be formed in an annular shape. Note that FIG. 13 (*b*) has a structure wherein the differential pressure diaphragm 4 of FIG. 8 (*b*) is a square shape. The other structures are identical to those above and thus explanations thereof will be omitted.

In this example, the static pressure gauge 16*d* is disposed at the edge portion of the static pressure diaphragm 17, and the static pressure gauge 15*b* is disposed in the center portion of the static pressure diaphragm 17. Consequently, the distance from the static pressure gauge 16*d* to the center point of the sensor chip is longer than the distance from the static pressure gauge 15*b* to the center point of the sensor chip. The same effect as in the above example can be obtained in this structure as well.

Figure 14:
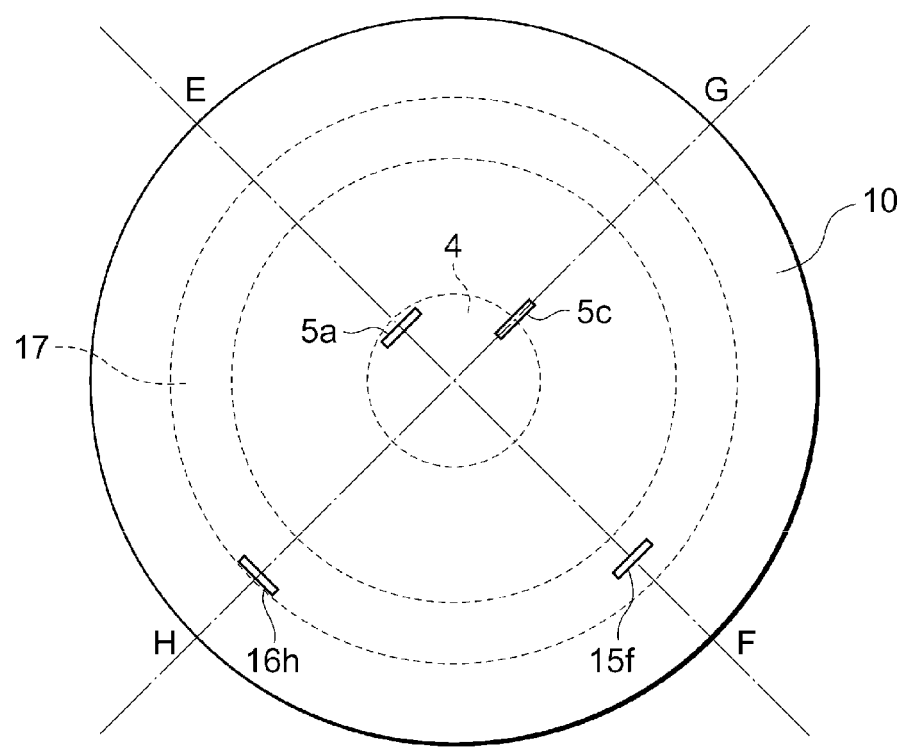
FIG. 14 is a top view illustrating the structure of a pressure sensor according to a further example of the present invention.

FIG. 14 will be used next to explain a pressure sensor as set forth in a further example of the present invention. FIG. 14 is a top view of the sensor chip 10 used in a pressure sensor. Note that the pressure sensor has a different sensor chip shape and diaphragm shape from the pressure sensor illustrated above. Specifically, the sensor chip 10 and the differential pressure diaphragm 4 are circular, and the static pressure diaphragm 17 has a circular annular shape. Note that the other fundamental structures are identical to those of the sensor chip 10 illustrated in the first form of embodiment, and thus explanations thereof will be omitted. That is, locations for which there is no particular explanation are identical to those above. The manufacturing process is also identical to above and thus the explanation thereof will be omitted.

In the present example, the sensor chip 10 is circular. Lines passing through the center of the circular sensor chip 10 are defined as line EF and line GH. These line EF and line GH are perpendicular to each other. Line EF and line GH correspond to diagonal line AB and diagonal line CD illustrated in the first form of embodiment. Additionally, the differential pressure diaphragm 4 is formed in the center portion of this sensor chip 10.

The differential pressure diaphragm 4 is circular. The differential pressure diaphragm 4 is concentric with the sensor chip 10. Additionally, the center of the differential pressure diaphragm 4 is coincident with the point of intersection between the line EF and the line GH. As with the first form of embodiment, the differential pressure gauge 5 is formed at the peripheral edge of the differential pressure diaphragm 4.

Furthermore, the static pressure diaphragm 17 is provided in the outer peripheral portion of the differential pressure diaphragm 4. In this example, only a single circular annular static pressure diaphragm 17 is provided. That is, instead of the two static pressure diaphragms 17 illustrated above, only a single ring-shaped static pressure diaphragm 17 is provided. The static pressure diaphragm 17 is formed through the provision of a circular annular groove in the sensor chip 10. The static pressure diaphragm 17 is disposed so as to surround the differential pressure diaphragm 4. The circular annular static pressure diaphragm 17 has a circular shape that is concentric with the sensor chip 10 and the differential pressure diaphragm 4. That is, the outer edge and the inner edge of the static pressure diaphragm 17 are circular, and the centers of those circles are coincident with the point of intersection between the line EF and the line GH.

Additionally, a static pressure gauge 15f and a static pressure gauge 16h are provided in the static pressure diaphragm 17. The static pressure gauge 15f is formed on the line FE, and the static pressure gauge 16h is formed on the line OH. The static pressure gauge 15f is formed in the center portion of the static pressure diaphragm 17. The static pressure gauge 16h is formed in the edge portion of the static pressure diaphragm 17. Here, the static pressure gauge 16h is formed in the edge portion of the static pressure diaphragm 17. Additionally, the static pressure gauges 15f and 16h are formed along directions that are perpendicular to the direction of width of the circular annulus. That is, the long direction of the static pressure gauges 15f and 16h match the circumferential direction and the long edges of the static pressure gauges 15f and 16h are perpendicular to the radial direction of the static pressure diaphragm 17.

The same effect as above can be obtained through structuring this way as well. That is, as explained, when a pressure is applied, the signs of the values of the changes in resistances are opposites in the static pressure gauge 15f and the static pressure gauge 16h. That is, the change in resistance of one of the static pressure gauge 15f and the static pressure gauge 16h will be positive, and the change in resistance of the other will be negative. As a result, the output of the bridge will become larger, increasing the sensitivity of the measurement relative to the pressure. Note that while in the present form of embodiment the static pressure gauge 15f was disposed on the line EF and the static pressure gauge 16h was disposed of the line GH, there is no limitation to this arrangement, but rather the same effect can be achieved insofar as the static pressure gauge 15f and the static pressure gauge 16h are formed, respectively, in an edge and in the center of the circular annular static pressure diaphragm 17.

Moreover, the changes in the values of the resistances caused by the stresses produced when there is a change in temperature are both in the same direction. That is, the stresses are produced in the same direction at the edge and the center of the static pressure diaphragm 17, and the resistance values change in the same direction. Consequently, even when there is a change in temperature, the change in the bridge output will be reduced. This makes it possible to suppress measurement error due to temperature variations. Doing so makes it possible to improve the thermal characteristics.

The arrangement of the static pressure gauge 15f and the static pressure gauge 16h and the static pressure diaphragm 17 as set forth above enables the achievement of a small high-performance pressure sensor.

Note that while in FIG. 14 the differential pressure diaphragm 4 and the outer edge and inner edge of the static pressure diaphragm 17 are circles, they may instead be polygons. In this case, preferably the polygon is a regular polygon, near to a circle. Preferably the number of corners in the polygon is even, and further is 2n (where n is a whole number no less than 3). Specifically, preferably the polygon is a regular polygon that is at least a regular octagon. More preferably, the polygon is a regular polygon that is at least a regular hexadecagon. For example, the number of corners may be increased, such as a regular polygon with 16 sides, a regular polygon with 32 sides, or a regular polygon with 64 sides. All of the corners of the polygon are at equal distances from the center of the sensor chip 10. Of course, of the differential pressure diaphragm 4 and the static pressure diaphragm 17, one may be a polygon with the other being a circle.

Figure 15:
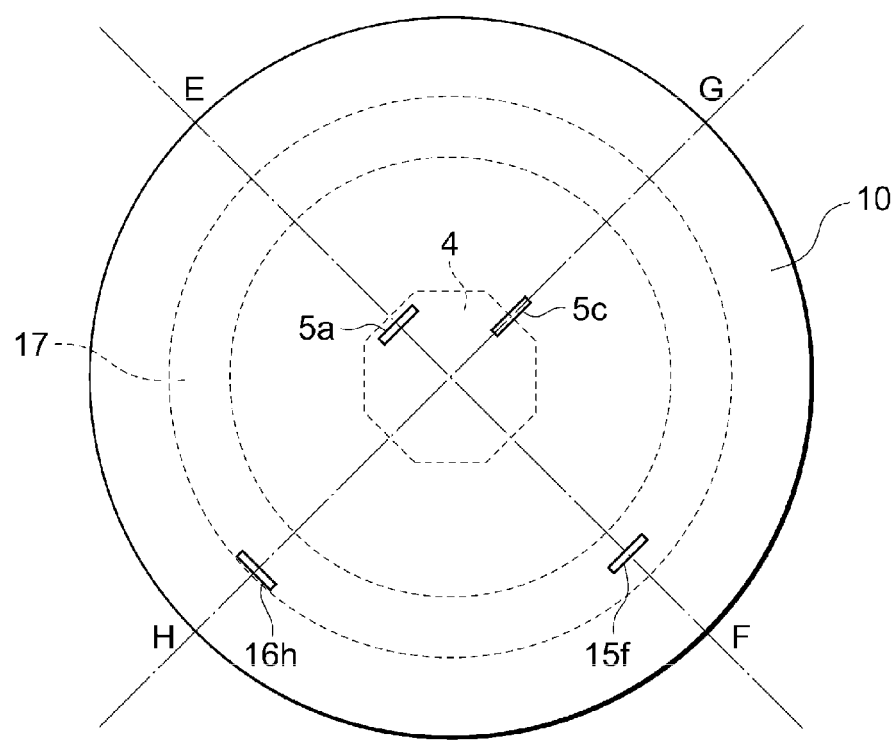
FIG. 15 is a top view illustrating another structure of a pressure sensor according to the further example.

For example, as illustrated in FIG. 15, the differential pressure diaphragm 4 may be a regular octagon with the static pressure diaphragm 17 being a circle. That is, the inner edge and the outer edge of the static pressure diaphragm 17 are circles. Conversely, the differential pressure diaphragm 4 may be a circle with the static pressure diaphragm 17 being a regular polygon.

Figure 16:
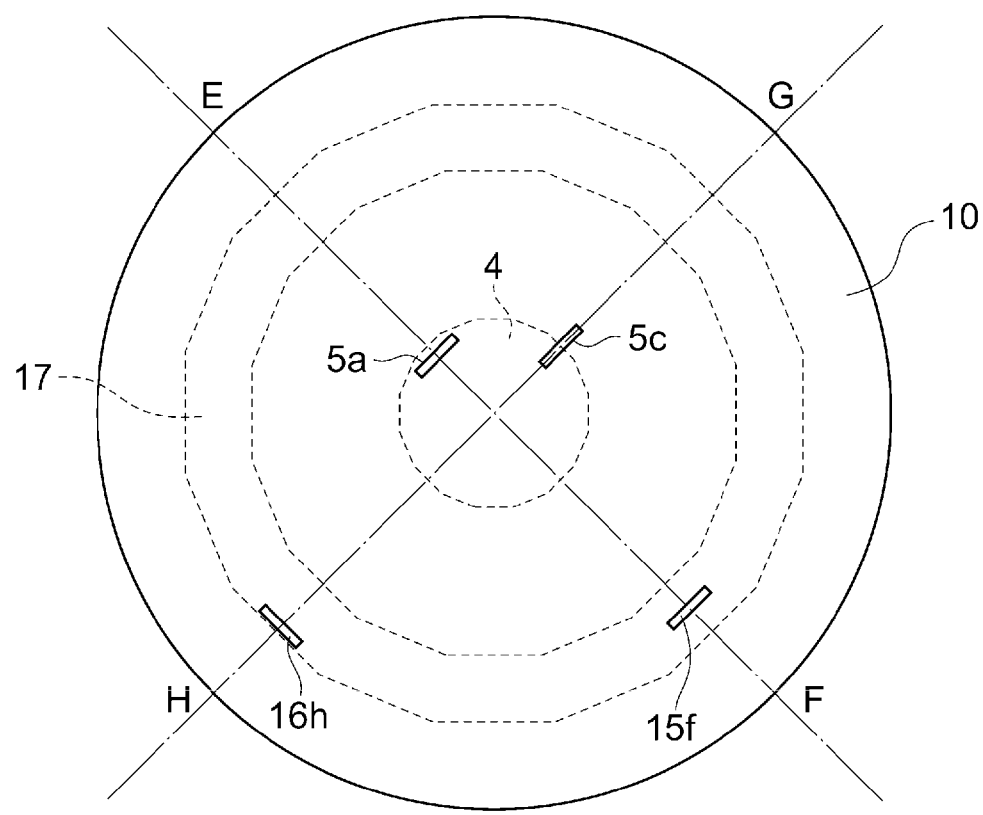
FIG. 16 is a top view illustrating another structure of a pressure sensor according to the further example of the present invention.

Furthermore, as illustrated in FIG. 16 the differential pressure diaphragm 4 and the static pressure diaphragm 17 may both be regular polygons. In FIG. 16, the differential pressure diaphragm 4 and the static pressure diaphragm 17 are both regular hexadecagons. Consequently, the inner edge and the outer edge of the static pressure diaphragm 17 are hexadecagons. In this way, essentially the same effect can be obtained through having the diaphragm be a polygon. Additionally, the sensor chip 10 may also be a regular polygon, in the same manner as the differential pressure diaphragm 4 and/or the static pressure diaphragm 17. Note that the various forms of embodiment may be combined as appropriate.

The invention claimed is:

1. A pressure sensor comprising:
a substrate;
a differential pressure diaphragm provided in the center portion of the substrate;
a differential pressure gauge provided on the differential pressure diaphragm;
a single static pressure diaphragm provided in the outer peripheral portion of the differential pressure diaphragm;
a first static pressure gauge formed on an edge portion of the static pressure diaphragm; and
a second static pressure gauge formed on a center portion of the static pressure diaphragm,
wherein the substrate is formed in a circular or polygonal shape;
wherein the single static pressure diaphragm is formed in an annular shape encompassing the differential pressure diaphragm,
wherein the first static pressure gauge is formed on a first imaginary line passing through a center of the substrate, and
wherein the second static pressure gauge is formed on a second imaginary line passing through the center of the substrate, the second imaginary line being perpendicular to the first imaginary line.

2. The pressure sensor as set forth in claim 1, wherein:
the first static pressure gauge is formed at the edge portion of a substrate center side or an edge portion of the substrate edge side of the static pressure diaphragm.

3. The pressure sensor as set forth in claim 1, wherein:
the first and second static pressure gauges are formed along directions that are perpendicular to the first and second imaginary lines, respectively.

4. The pressure sensor as set forth in claim 1, wherein:
the single static pressure diaphragm is formed in a circular or polygonal shape.

5. The pressure sensor as set forth in claim 1, wherein:
the single static pressure diaphragm in the annular shape and the differential pressure diaphragm in a circular or polygonal shape are arranged concentrically.

* * * * *